United States Patent
Hasegawa et al.

(10) Patent No.: US 10,067,700 B2
(45) Date of Patent: Sep. 4, 2018

(54) STORING META-INFORMATION ON TAPE RECORDING SYSTEMS

(71) Applicant: International Business Machines Corporation, Armonk, NY (US)

(72) Inventors: Tohru Hasegawa, Tokyo (JP); Hiroshi Itagaki, Yokohama (JP); Shinsuke Mitsuma, Machida (JP); Terue Watanabe, Tokyo (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 14/834,715

(22) Filed: Aug. 25, 2015

(65) Prior Publication Data

US 2016/0077757 A1   Mar. 17, 2016
US 2017/0336999 A9   Nov. 23, 2017

(30) Foreign Application Priority Data

Sep. 4, 2014  (JP) .................. 2014-180165

(51) Int. Cl.
*G06F 3/06*   (2006.01)
*G11B 27/32*   (2006.01)

(52) U.S. Cl.
CPC ............ *G06F 3/0622* (2013.01); *G06F 3/067* (2013.01); *G06F 3/0673* (2013.01); *G11B 27/328* (2013.01); *G11B 2220/93* (2013.01)

(58) Field of Classification Search
CPC ...... G06F 3/0622; G06F 3/067; G06F 3/0973; G11B 27/328; G11B 2220/93; G11B 2220/956
See application file for complete search history.

(56) References Cited

U.S. PATENT DOCUMENTS 5,522,037 A * 5/1996 Kitagawa ............ G06F 11/1451
                                                    714/40
6,141,773 A * 10/2000 St. Pierre ............ G06F 11/1451
                                                    711/162
(Continued)

FOREIGN PATENT DOCUMENTS

JP   2002055863 A   2/2002
JP   2004029991 A   1/2004
(Continued)

OTHER PUBLICATIONS

D. Pease, A. Amir, L. V. Real, B. Biskeborn, M. Richmond and A. Abe, "The Linear Tape File System," 2010 IEEE 26th Symposium on Mass Storage Systems and Technologies (MSST), Incline Village, NV, 2010, pp. 1-8.*

(Continued)

*Primary Examiner* — Ramon A. Mercado
(74) *Attorney, Agent, or Firm* — Bryan D. Wells

(57) ABSTRACT

A capability to store meta-information related to file access histories on tape recording systems is provided. Base meta-information is stored on a tape. The base meta-information is meta-information that is associated with one or more files that are stored on the tape and is based, at least in part, on a tape access operation history. A first quantity of differentiated meta-information is stored on the tape at a predetermined time interval after storing the base meta-information, wherein the first quantity of differentiated meta-information is based, at least in part, on the tape access operation history and reflects a history of at least one file of the one or more files that are associated with the base meta-information.

18 Claims, 14 Drawing Sheets

(56) References Cited

U.S. PATENT DOCUMENTS

| | | | | |
|---|---|---|---|---|
| 6,349,294 | B1* | 2/2002 | Shaath | G06F 3/061 |
| | | | | 707/715 |
| 6,675,177 | B1* | 1/2004 | Webb | G06F 11/1458 |
| 7,430,647 | B2* | 9/2008 | Sandorfi | G06F 11/1448 |
| | | | | 707/999.202 |
| 8,676,809 | B1* | 3/2014 | Naftel | G06F 11/1448 |
| | | | | 707/746 |
| 9,009,114 | B1* | 4/2015 | Sridharan | G06F 11/1448 |
| | | | | 707/646 |
| 9,063,666 | B2* | 6/2015 | Amir | G06F 3/0611 |
| 9,292,227 | B2* | 3/2016 | Ashida | G06F 3/0686 |
| 9,383,945 | B2* | 7/2016 | Hasegawa | G06F 3/0686 |
| 2001/0034737 | A1* | 10/2001 | Cane | G06F 11/1451 |
| 2008/0059736 | A1* | 3/2008 | Murayama | G06F 11/1451 |
| | | | | 711/162 |
| 2008/0244205 | A1* | 10/2008 | Amano | G06F 11/1451 |
| | | | | 711/162 |
| 2011/0238716 | A1* | 9/2011 | Amir | G06F 3/0611 |
| | | | | 707/823 |
| 2013/0132663 | A1* | 5/2013 | Eleftheriou | G06F 12/0866 |
| | | | | 711/111 |
| 2013/0148227 | A1* | 6/2013 | Tofano | G06F 3/0608 |
| | | | | 360/48 |
| 2013/0326134 | A1* | 12/2013 | Carter | G06F 3/0608 |
| | | | | 711/111 |
| 2014/0095440 | A1* | 4/2014 | Kamei | G06F 11/1453 |
| | | | | 707/652 |
| 2014/0149698 | A1* | 5/2014 | Ezra | G06F 3/0614 |
| | | | | 711/162 |

FOREIGN PATENT DOCUMENTS

| | | |
|---|---|---|
| JP | 2005128861 A | 5/2005 |
| JP | 2006331472 A | 12/2006 |
| JP | 2006333293 A | 12/2006 |
| JP | 2012243339 A | 12/2012 |
| JP | 2013093084 A | 5/2013 |
| JP | 2013191259 A | 9/2013 |
| WO | 2013054597 A1 | 4/2013 |

OTHER PUBLICATIONS

Hasegawa et al., "A Method to Improve the Restoration of Files from Tape File Systems", English abstract, Provision No. 72 Winter 2012, 9 page, publication date Feb. 8, 2012.

"Linear Tape File System (LTFS) Format Specification", Mar. 11, 2011, LFTS Format Version 2.0.0, pp. 1-69.

"Method for Storing Meta-information, Program, and Tape Recording System Therefor", Japan Application No. 2014-180165, Filed on Sep. 4, 2014, pp. 1-43.

\* cited by examiner

| File Size | No. of Files Written in 5-Minute Span | Size of Written Area of Files |
|---|---|---|
| 10 KB | 3,669 | 35 MB |
| 20 KB | 3,377 | 55 MB |
| 30 KB | 3,346 | 103 MB |

| File Size | Size of Written Area in Files | Size of Written Area in Meta-information | Proportion of Meta-information in Data Partition |
|---|---|---|---|
| 10 KB | 46 GB | 1,377 GB | 97% |
| 20 KB | 67 GB | 1,337 GB | 94% |
| 30 KB | 127 GB | 1,296 GB | 91% |

| File Size | Size of Written Area in Files | Size of Written Area in Meta-information | Proportion of Meta-information in Data Partition |
|---|---|---|---|
| 10 KB | 46 GB | 1,377 GB | 97% |
| 20 KB | 67 GB | 1,337 GB | 94% |
| 30 KB | 127 GB | 1,296 GB | 91% |

FIG. 15A

| File Size | Size of Written Area in Files | Size of Written Area in Meta-information | Proportion of Meta-information in Data Partition |
|---|---|---|---|
| 10 KB | 1,359 GB | 65 GB | 4.6% |
| 20 KB | 1,391 GB | 33 GB | 2.3% |
| 30 KB | 1,402 GB | 22 GB | 1.6% |

FIG. 15B

STORING META-INFORMATION ON TAPE RECORDING SYSTEMS

TECHNICAL FIELD OF THE INVENTION

The present invention relates to tape recording systems and, more specifically, to storing meta-information related to file access histories on tape recording systems.

BACKGROUND OF THE INVENTION

Linear Tape File System (LTFS) is a type of file system that is used in tape drives. LTFS enables an application run on an operating system (OS; e.g., Linux, Windows, MacOSX) of a computer in communication with a tape cartridge to read and write data in the tape cartridge as files. In the LTFS format, the tape cartridge is divided into two partitions: an index partition (IP) and a data partition (DP). Meta-information, such as file allocation information, is recorded in the index partition, and the main data is recorded in the data partition. Because tape is a sequential access device and data is usually appended to the tape, file allocation information is generally recorded at the end of the tape when recording data in one of the partitions. The information at the end of the tape is read when a tape cartridge is mounted. When a tape cartridge is unmounted in LTFS, at least some meta-information is overwritten with updated meta-information at the beginning of the index partition. When the tape cartridge is mounted, the meta-information can be read from the index partition.

SUMMARY

According to one embodiment of the present disclosure, a method for storing meta-information related to file access histories on tape recording systems is provided. The method includes storing base meta-information on a tape, wherein the base meta-information is meta-information that is associated with one or more files that are stored on the tape and is based, at least in part, on a tape access operation history; and storing a first quantity of differentiated meta-information on the tape at a predetermined time interval after storing the base meta-information, wherein the first quantity of differentiated meta-information is based, at least in part, on the tape access operation history and reflects a history of at least one file of the one or more files that are associated with the base meta-information.

According to another embodiment of the present disclosure, a storage system that stores meta-information related to a file written to a tape storage medium is provided. The storage system comprises one or more storage media, the one or more storage media including a tape. The storage system operates to store base meta-information on the tape, wherein the base meta-information is meta-information that is associated with one or more files that are stored on the tape and is based, at least in part, on a tape access operation history; and store a first quantity of differentiated meta-information on the tape at a predetermined time interval after storing the base meta-information, wherein the first quantity of differentiated meta-information is based, at least in part, on the tape access operation history and reflects a history of at least one file of the one or more files that are associated with the base meta-information.

According to another embodiment of the present disclosure, a method for recovering information from a tape storage medium is provided. The method includes reading a most recently written quantity of base meta-information from a data partition of a tape; responsive to determining that the data partition includes subsequent differentiated meta-information that was written to the data partition after the most recently written quantity of base meta-information, updating the base meta-information based at least in part, on the subsequent differentiated meta-information to construct a recovered index of meta-information; and appending the recovered index of meta-information to an index partition of the tape.

According to another embodiment of the present disclosure, a storage system that recovers information from a tape storage medium is provided. The storage system comprises one or more storage media, the one or more storage media including a tape. The storage system operates to read a most recently written quantity of base meta-information from a data partition of a tape; determine that the data partition includes subsequent differentiated meta-information that was written to the data partition after the most recently written quantity of base meta-information, and in response, update the base meta-information based at least in part, on the subsequent differentiated meta-information to construct a recovered index of meta-information; and append the recovered index of meta-information to an index partition of the tape.

BRIEF DESCRIPTION OF THE DRAWINGS

FIGS. 4A-4D show the content of the index partition and the data partition in an LTFS-formatted medium, in accordance with an embodiment of the present disclosure.

FIGS. 15A and 15B show tables that compare the data volume and meta-information volume when 10-KB, 20-KB and 30-KB files are written to a tape cartridge with the LTFS of the present disclosure and xcopy command, in accordance with an embodiment of the present disclosure.

DETAILED DESCRIPTION

Figures 1A, 1B, 2:
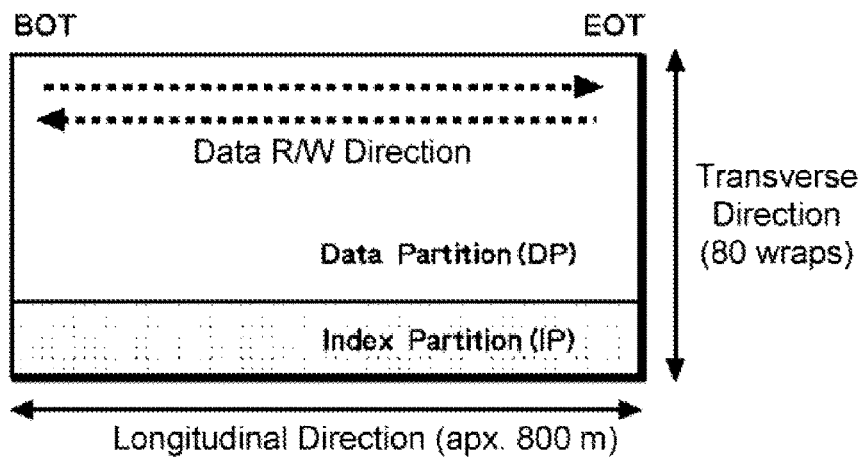
FIGS. 1A and 1B show tables indicating the file volume when 10-KB, 20-KB and 30-KB files are written to a tape cartridge with the conventional LTFS and xcopy command.
FIG. 2 shows tape divided into two LTFS partitions.

In a conventional LTFS, meta-information is written to both the index partition and the data partition of a tape. When the tape is unmounted, the index partition is updated based, at least in part, on the meta-information stored in the data partition. In some cases, however, meta-information occupies most of the data partition. Embodiments of the present disclosure recognize a need to reduce the amount of meta-information that is written to the data partition. While storing meta-information in the data partition reduces the amount of file data that the tape can store, periodically writing meta-information to the data partition is advantageous in the event of a sudden loss of power. In some cases, meta-information is written to the data partition at intervals that are unknown to the user of the LTFS for this purpose. Following a loss of power, the index partition can be updated (i.e., recovered) using meta-information stored in the data partition. Embodiments of the present disclosure provide an ability to periodically store changes to meta-information relating to file update operations (e.g., changes, additions, deletions, etc.) on tape recording systems. These embodiments store the portions of the meta-information that differ from previously stored meta-information (i.e., differentiated meta-information) to, at least in part, reduce the amount of meta-information that is stored in the data partition relative to a conventional LTFS.

Embodiments of the present disclosure provide a method for periodically storing, via the file system used in a tape recording system, meta-information related to file update operations (changes, additions, deletions, etc.) including only the portions that differ from the previously stored meta-information (differentiated meta-information).

Some embodiments of the present disclosure are a method for storing on tape meta-information related to a file written to the tape. The method includes the steps of: (a) storing on tape meta-information (base meta-information) related to a valid file stored on the tape as a result of the tape access operation history (additions, deletions, changes, etc.) for at least one file; and (b) storing on tape at a predetermined time interval, after base meta-information has been stored, meta-information related to a file reflected in the access operation history as a result of the tape access operation history for the file, the file being either a valid file or a new file; (b1) the step of storing meta-information at a predetermined time interval storing, on the tape at the predetermined time interval only after base meta-information has been stored, the meta-information related to a file reflected in the access operation history as the preceding differentiated meta-information.

In such embodiments, (b2) the step of storing meta-information at a predetermined time interval may store, on the tape at the predetermined time interval only after base meta-information has been stored, the meta-information related to a file reflected in the access operation history as the subsequent differentiated meta-information.

In a file system for a tape recording device having a tape partitioned into a data partition for writing file data and an index partition for storing meta-information on files, such embodiments may also include the steps of: appending the base meta-information to the data partition; appending differentiated meta-information to the data partition at a predetermined time interval with respect to the file access operation history of the tape after the base meta-information has been appended; adding or updating differentiated meta-information in the base meta-information to construct new meta-information and storing the new meta-information in the index partition when the tape is ejected; appending subsequent differentiated meta-information to the data partition at a predetermined time interval with respect to the file access operation history of the tape after differentiated meta-information has been appended; and adding or updating the differentiated meta-information in the base meta-information to construct new meta-information and storing the new meta-information in the index partition when the tape is ejected or when a predetermined command has been issued; the appended base meta-information and differentiated meta-information also being appended to the data partition along with tags (identification tags) identifying the meta-information as base meta-information or differentiated meta-information.

In such embodiments, steps (b1) and (b2) for storing meta-information at a predetermined time interval may also include the steps of: adding a new delete flag indicating deletion of stored files to the meta-information when existing stored files are to be deleted in a subsequent file access operation history up until the preceding timing interval; including the delete flag indicating deletion of the stored files in the subsequent differentiated meta-information; and appending to the tape differentiated meta-information including the delete flag as the subsequent differentiated meta-information.

In such embodiments, steps (b1) and (b2) for storing meta-information at a predetermined time interval may also include the step of: appending to the tape, as differentiated meta-information, meta-information on appended data succeeding the data parts of the existing file when the update history after the preceding timing interval appends data due to changes in the existing file.

In such embodiments, steps (b1) and (b2) for storing meta-information at a predetermined time interval may also include the step of: appending to the tape, as differentiated meta-information, meta-information changing the file name in the file ID of an existing file when the file name of a file has been changed in the update history up to the previous timing interval.

Some embodiments of the present disclosure are a method for recovering an index in an index partition from tape storing differentiated meta-information using the storage method described above. This method for recovering an index includes the steps of: (a) reading the most recently written base meta-information in the meta-information identified by index tags in the data partition; (b) determining whether or not there is any meta-information to be written next; (c) reading the meta-information in the differentiated meta-information retrieved in step (a), and reading the file IDs of each file and directory written in the information; (d) determining whether or not a file ID included in the differentiated meta-information is also included in the base meta-information; and (e) updating the meta-information with, for example, the file associated with the base meta-information when a file ID is included in the base meta-information in step (d).

Such embodiments may also include the step of (f) adding meta-information on, for example, a file related to the base meta-information when a file ID in step (d) is not included in the base meta-information.

Such embodiments may also include the step of (g) storing in the index partition the base meta-information retrieved in step (a) when there is no differentiated meta-information in step (b).

Some embodiments of the present disclosure are a tape recording system for storing on tape meta-information related to a file written to the tape. This system executes the steps of: (a) storing on tape meta-information (base meta-information) related to a valid file stored on the tape as a result of the tape access operation history (additions, deletions, changes) for at least one file; and (b) storing on tape at a predetermined time interval, after base meta-information has been stored, meta-information related to a file reflected in the access operation history as a result of the tape access operation history for the file, the file being either a valid file or a new file; (b1) the step of storing meta-information at a predetermined time interval storing, on the tape at the predetermined time interval only after base meta-information has been stored, the meta-information related to a file reflected in the access operation history as the preceding differentiated meta-information.

Some embodiments of the present disclosure are a program for a tape recording system for storing on tape meta-information related to a file written to the tape. This program executes in the tape recording system the steps of: (a) storing on tape meta-information (base meta-information) related to a valid file stored on the tape as a result of the tape access operation history for at least one file; and (b) storing on tape at a predetermined time interval, after base meta-information has been stored, meta-information related to a file reflected in the access operation history as a result of the tape access operation history for the file, the file being either a valid file or a new file; (b1) the step of storing meta-information at a predetermined time interval storing, on the tape at the predetermined time interval only after base meta-information has been stored, the meta-information related to a file reflected in the access operation history as the preceding differentiated meta-information.

Some embodiments of the present disclosure are a tape recording device system for recovering an index in an index partition from tape storing differentiated meta-information using the storage method described above. This tape recording device system executes the steps of: (a) reading the most recently written base meta-information in the meta-information identified by index tags in the data partition; (b) determining whether or not there is any meta-information to be written next; (c) reading the meta-information in the differentiated meta-information retrieved in step (a), and reading the file IDs of each file and directory written in the meta-information; (d) determining whether or not a file ID included in the differentiated meta-information is also included in the base meta-information; and (e) updating the meta-information with, for example, the file associated with the base meta-information when a file ID is included in the base meta-information in step (d).

Some embodiments of the present disclosure are a program for recovering an index in an index partition from tape storing differentiated meta-information using the storage method described above. This program executes in a tape recording device system the steps of: (a) reading the most recently written base meta-information in the meta-information identified by index tags in the data partition; (b) determining whether or not there is any meta-information to be written next; (c) reading the meta-information in the differentiated meta-information retrieved in step (a), and reading the file IDs of each file and directory written in the meta-information; (d) determining whether or not a file ID included in the differentiated meta-information is also included in the base meta-information; and (e) updating the meta-information with, for example, the file associated with the base meta-information when a file ID is included in the base meta-information in step (d).

Application of the present disclosure in the manner described above enables meta-information to be recovered in the case of a sudden loss of power while also keeping the meta-information from occupying most of the data partition.

The present disclosure will now be discussed with reference to the Figures. FIGS. 1A and 1B show tables indicating the file volume when 10-KB, 20-KB and 30-KB files are written to a tape cartridge with the conventional LTFS and xcopy command. When the Windows version of LTFS and the LTO5 tape drive from IBM are used to write 10-KB, 20-KB and 30-KB files to a tape cartridge using the xcopy command, more than 3,000 files of each type can be written in five minutes as shown in FIG. 1A.

FIG. 1A shows the number of files and the sizes of the files to be written. In the default setting, meta-information is written to the data partition every five minutes, and the meta-information for 3,000 files occupies about 1,440 KB. Because approximately 3,000 files are written every five minutes, 2,880 KB of meta-information for approximately 6,000 files has been written after ten minutes.

FIG. 1B shows the files and amount of meta-information written to the data partition. In an LTO5 tape cartridge, the size of the data partition is 1.425 TB. As shown in FIG. 1B, when as many files as possible are written, 90% or more of the data partition is taken up by meta-information. In other words, only 10% or less of the entire data partition in the tape cartridge can be used to store file data. When meta-information is periodically written to prepare for a sudden loss of power, most of the data partition is taken up by meta-information, and the portion used to save files is reduced.

The following is an explanation of an embodiment of the present disclosure in which meta-information reflecting the file access operation history up to the most recently saved meta-information is stored on the tape at a predetermined time interval. In the present disclosure, the meta-information written to the data partition of the tape is divided into two groups, Group A and Group B, based on the timing used to write the meta-information. The present disclosure refers to meta-information in Group A as base meta-information and meta-information in Group B as differentiated meta-information. Differentiated meta-information includes only that information which differs from the previously written meta-information. When meta-information is generated inside the file system (LTFS), the group to which the meta-information belongs can be determined in this way. Group A (i.e., base meta-information) includes: (1) meta-information written at the beginning of the tape during formatting; (2) meta-information written during an unmounting operation; and (3) meta-information explicitly created by the user through an API such as FluchFileBuffers( ). Group B (i.e., differentiated meta-information) includes meta-information written periodically or written automatically when a file is closed, in accordance with various LTFS settings.

In various embodiments, the operation of the ltfsck application (an application used when a sudden loss of power has occurred) is changed to take into account the grouping of meta-information described above (ltfsck is an abbreviation of LTFS check, which is the application API incorporating the current recovery function). In this operation, meta-information to be written to the index partition is created (or recovered) from meta-information in the data partition. When meta-information is recovered, it is based on the most recent meta-information in Group A (i.e., base meta-information) which has been written to the data partition. The final meta-information is created using meta-information (i.e., differentiated meta-information) reflecting only the operation history (additions, deletions, changes, etc.) executed in relation to files since the base meta-information was last stored. This meta-information is the most recent base meta-information, and the recovery process is complete once it has been written to the end of the data partition and to the index partition.

In order to explain the basic operations performed in various embodiments of the present disclosure, the LTFS format, tape drive, and data writing process for files in LTFS will be described. FIG. 2 shows the data areas on a typical tape which has been divided into two partitions for use in LTFS. In an LTO5 tape drive, data is written back and forth on "wraps", which are write areas extending in the longitudinal direction of the tape. In LTFS, two wraps (one round trip) are used as the index partition. The tape is divided into two partitions, an index partition (IP) and a data partition (DP), from the beginning of the tape (BOT) to the end of the tape (EOT). A head is able to simultaneously read and write data from a group of tracks, and each wrap corresponds to 16 tracks. In an LTO5 tape cartridge, the tape is approximately 800 m long and 80 wraps wide. The index partition (IP) and the data partition (DP) are separated by a guard band composed of two wraps. The tape advances forward and backward in the longitudinal direction of the wraps, and reverses direction at the BOT and the EOT. This change in direction is called a "wrap turn". It takes the head in a tape drive 60 to 90 seconds to travel longitudinally along the tape from BOT to EOT. The head travels longitudinally along half of the tape in 30 to 45 seconds.

In the file system for the tape drive, that is, in LTFS, data written to a medium can be displayed as files. When a user writes data to a tape medium using LTFS, meta-information referred to as an index file (or simply as "the index") is written to the tape medium in addition to the files themselves. The meta-information in the index includes directory names, file names, file creation dates, and position information such as the positions of the files on the medium, the sizes of the files, and offsets in the files (the extents described in FIG. 5) in XML format. A new index is written to the index partition (IP). The files themselves and the index history are written to the data partition (DP).

When files are written to and read from a tape medium using LTFS, the data is written and read in units called "records". Records in the LTFS format are called "blocks". Blocks are managed using a number which refers to the number of blocks from the beginning of the partition in each partition including recorded file data. Position information for the data files is indicated using block numbers and included in the index file.

Figure 3:
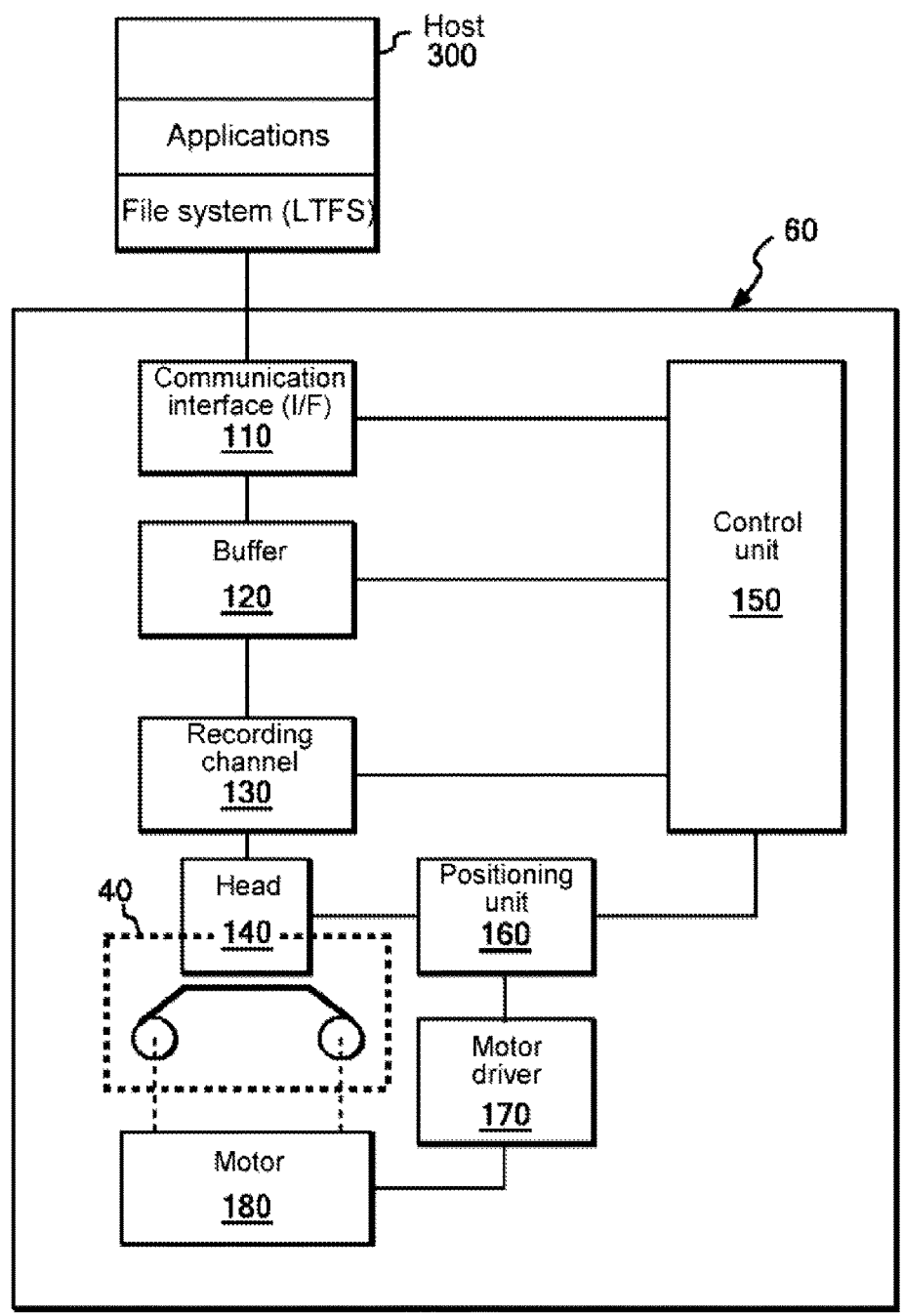
FIG. 3 shows an example of a hardware configuration for a tape storage system (tape recording device system) including a tape drive (magnetic tape drive) connected to a host, in accordance with an embodiment of the present disclosure.

FIG. 3 shows an example of a hardware configuration for a tape cartridge system (tape recording device system) including a tape drive (magnetic tape drive) connected to a host, in accordance with an embodiment of the present disclosure. The tape drive 60 receives read/write requests from an application in a host 300 via the file system (LTFS). The tape drive includes a communication interface (I/F) 110, a buffer 120, a recording channel 130, a read/write head 140, a control unit 150, a positioning unit 160, a motor driver 170, and a motor 180.

The interface 110 communicates with a host 300 via a network. For example, the interface 110 receives from the host 300 write commands instructing the device to write data to a tape cartridge (tape, medium) 40. The interface 110 also receives from the host 300 read commands instructing the device to read data from the medium 40. The interface 110 has a function for compressing write data and decompressing compressed read data. This function increases the actual storage capacity of the medium relative to the data by nearly a factor of two.

The tape drive 60 reads and writes to the medium 40 in data set (DS) units composed of a plurality of records sent from an application in the host 300. The typical size of a DS is 4 MB. An application in the host 300 specifies a file in the file system (such as LTFS-API), and read/write access is issued to the tape drive 60. In the file system, records and write/read requests are sent to the tape drive on the SCSI command level. Data sets (DS) are composed of a plurality of records.

Each DS includes management information related to the data set. User data is managed in record units. Management information is included in a data set information table (DSIT). A DSIT includes the number of records or blocks and the number of file marks (FM) in the DS, and the cumulative number of records and FMs that have been written from the beginning of the medium.

The buffer 120 is memory used to temporarily store data to be written to the medium 40 or data to be read from the medium. For example, the buffer 120 may be dynamic random-access memory (DRAM). A recording channel 130 is a communication pathway used to write data stored in the buffer 120 to the medium 40 or to temporarily store data read from the medium 40 in the buffer 120.

The read/write head 140 has a data read/write element for writing data to the medium 40 and reading data from the medium 40. The read/write head 140 in the present embodiment has a servo read element for reading signals from the servo tracks provided on the medium 40. The positioning unit 160 directs the movement of the read/write head 140 in the shorter direction (width direction) of the medium 40. The motor driver 170 drives the motor 180.

The tape drive 60 writes data to a tape and reads data from a tape in accordance with commands received from the host 300. The tape drive 60 includes a buffer, a read/write channel, a head, a motor, tape-winding reels, read/write controls, a head alignment control system, and a motor driver. A tape cartridge is detachably loaded in the tape drive. The tape moves longitudinally as the reels rotate. The head writes data to the tape and reads data from the tape as the tape moves longitudinally. The tape cartridge 40 includes non-contact/non-volatile memory called cartridge memory (CM). The tape drive 60 reads and writes to the CM installed in the tape cartridge 40 in a non-contact manner. The CM stores cartridge attributes. During reading and writing, the tape drive retrieves cartridge attributes from the CM in order to perform the read/write operation properly.

The control unit 150 controls the entire tape drive 60. In other words, the control unit 150 controls the writing of data to the medium 40 and the reading of data from the medium 40 in accordance with commands received via the interface. The control unit 150 also controls the positioning unit 160 in accordance with retrieved servo track signals. In addition, the control unit 150 controls the operation of the motor via the positioning unit 160 and the motor driver 170. The motor driver 170 may be connected directly to the control unit 150.

FIGS. 4A-4D show the content of the index partition and the data partition in LTFS-formatted mediums, in accordance with an embodiment of the present disclosure.

Figures 4A, 4B, 4C, 4D:
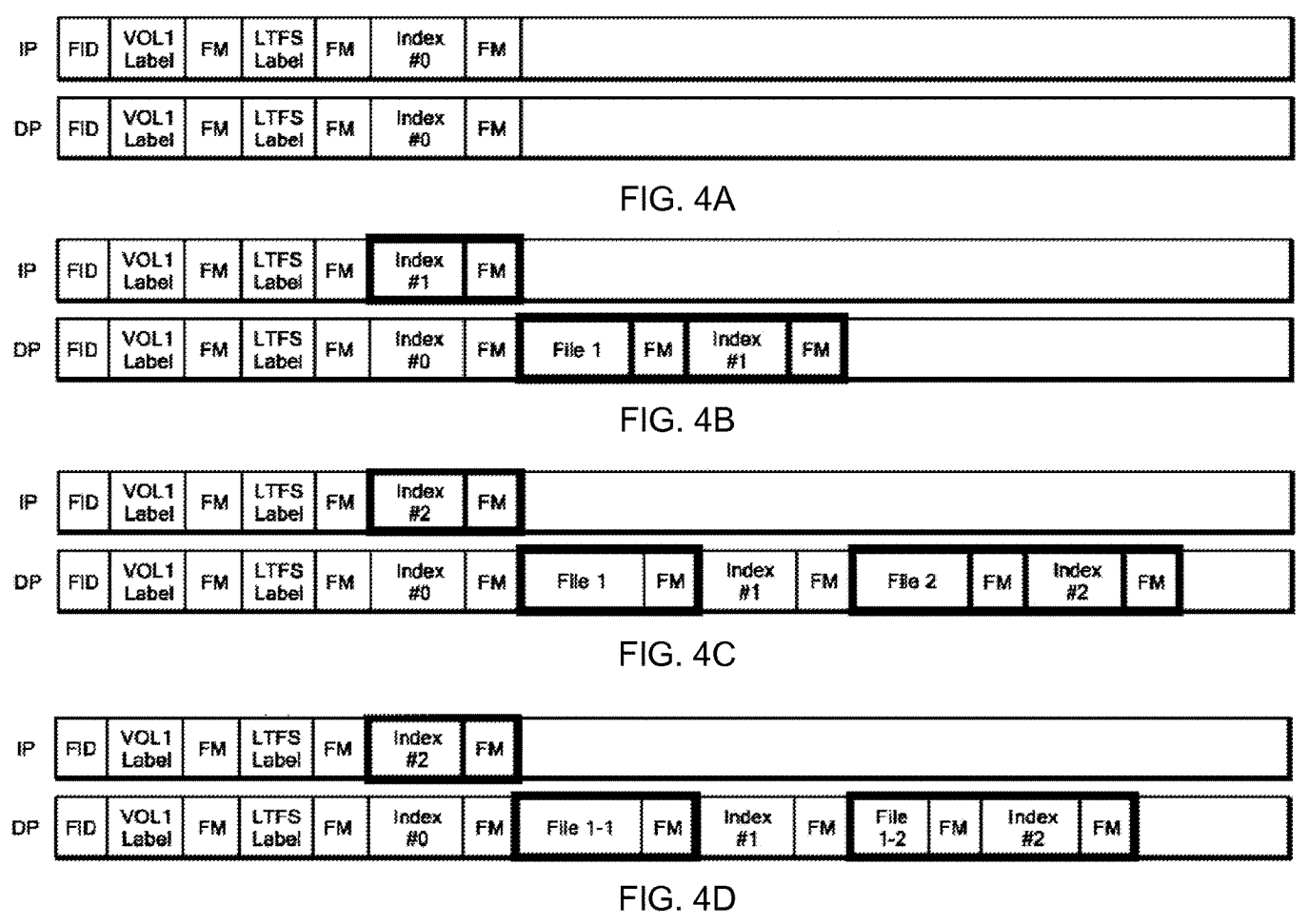

FIG. 4A shows information written to a tape medium immediately after the tape medium has been initialized using the LTFS format. The information shown in FIG. 4A is to be written to the tape medium immediately after the tape medium has been initialized using the LTFS format.

A Format Identification Dataset (FID) is special data written at the beginning of the tape medium when the tape drive initializes the tape medium, and includes information such as the number of partitions in the tape medium and the capacity of each partition. A VOL1 Label, also called the ANSI Label, is a general format label literally defined by ANSI. A LTFS Label is a label stipulated by the LTFS format, and holds information indicating which version of the LTFS format was used to format the tape medium. The size of the records recorded on the medium is indicated here. The record size is also known as the block size. The record size is ensured even when the end of the file is less than the block size. File marks (FM) are commonly used in tape media. These are used to specify the head of data (seek), and function similar to bookmarks. Index #0 is the index written during formatting. At this stage, it does not include file-specific information because no files are present, but rather holds information such as the volume name of the tape medium.

FIG. 4B shows information written to a tape medium when a file has been written after the tape medium has been initialized using the LTFS format. More specifically, FIG. 4B shows the data written to the tape medium when a file (File 1) is written after initialization of the tape medium using the LTFS format. The portion demarcated by the bold lines is added/updated data. Index#1 has meta-information (index information) on File 1. The IP only holds an updated index. The DP holds the index history. The timing for updating the index is left to the implementation of the file system. Updates may be performed at fixed time intervals or may be updated only when a tape medium is removed from the tape drive, for example. Even in the case of further continued use, the index positioned in the IP is always only the most recent index, and files and indices are appended to the DP without overwriting the existing indices.

FIG. 4C shows information written to a tape medium when another file has been written (File 2) following the state shown in FIG. 4B. When an initial file (File 1) has been written to the tape medium and the next file (File 2) is added, File 1 and File 2 are stored continuously on the tape medium. Index#2 has meta-information (the index information) for File 1 and File 2.

FIG. 4D shows meta-information written to a tape medium following the state shown in FIG. 4C when character information (File 1-2) has been appended to the end of File 1 and File 1 has been updated. After a file written to the tape medium has been updated using a document creating application, a single file (File 1) is fragmented (dispersed) and recorded as File 1-1 and File 1-2. During file rewriting, the reduction in the amount of free capacity in the tape medium at the time of the update depends on the amount of information.

Figure 5A:
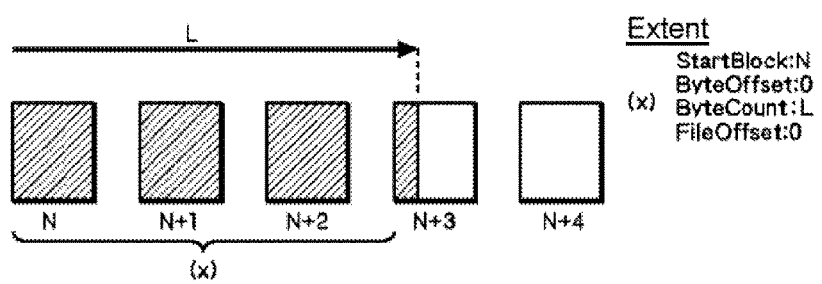
FIGS. 5A-5B show changes made to the position meta-information (extent) included in the index file when a single file has been partially rewritten, in accordance with an embodiment of the present disclosure.
Figure 5B:
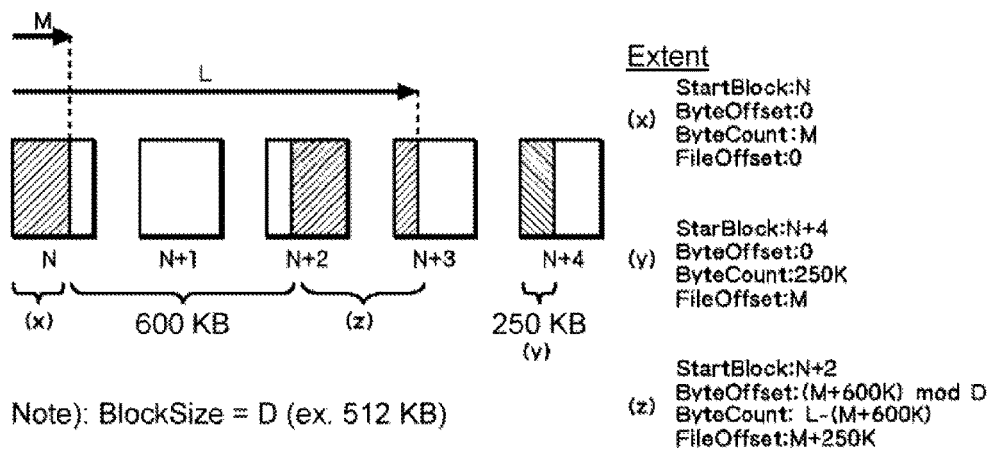

FIGS. 5A and 5B show changes made to the position meta-information (extent) included in the index file when a single file has been partially rewritten, in accordance with an embodiment of the present disclosure.

In an index, file position information (pointers) are stored in a format called an "extent". Extent "elements" include the number of the block (N, StartBlock) at the beginning of a file portion (data portion), the start offset (ByteOffset) inside the block of this number, the size of the data (L, ByteCount), and the file position in the data portion (M, FileOffset). User data is stored on the medium in record units of a size determined by the block size (D, for example, 512 KB). "StartBlock" indicates the order of blocks of a fixed size from the beginning of the tape medium. "ByteOffset" indicates the offset for the beginning of writing inside a block of a particular number. "ByteCount" indicates the data size of the data portion indicated by the extent. "FileOffset" indicates the file position in the data portion indicated by the extent. A block includes a record or FM (File Marker: record delimiter), and the size is indicated in the LTFS Label. The user data is recorded in the medium in record units of a size determined by the block size (for example, 512 KB).

At the beginning, in FIG. 5A, when the size of File 1 recorded on the medium is L, the index indicates extent (x). File 1 is written continuously in record units on the tape medium in the longitudinal direction as indicated by the cross-hatched portion. The records correspond to blocks in the extent. When a data portion is rewritten after File 1 has been written, as shown in FIG. 5B, and 600 KB from the Mbytes of File 1 has been replaced with a 250 KB record, and extents (x), (y) and (z) are written. Extent (y) indicates the 250 KB data (record) in which 600 KB have been changed and written to a data portion of File 1. The data portions are not consecutive, so this is appended as a record of successive block numbers (StartBlock: N+4). In extent (y), 250 KB is appended (append write) from ByteOffset=0 of StartBlock=N+4. Extent (x) indicates the data (record) to ByteCount=M of StartBlock=N. Here, 600 KB of data has been changed from offset M of Block N. Extent (z) indicates a data portion of ByteCount=L−(M+600) from ByteOffset= (M+600 K) modD of StartBlock=N+2. Here, D is the block size (for example, 512 KB). ByteOffset is the remainder of M+600 KB divided by D, and the offset is provided in block number N+2. The index of File 1 includes fragmented (dispersed) alignment information so that extent (x)→extent (y)→extent (z) due to the rewriting of data portions.

Figure 6:
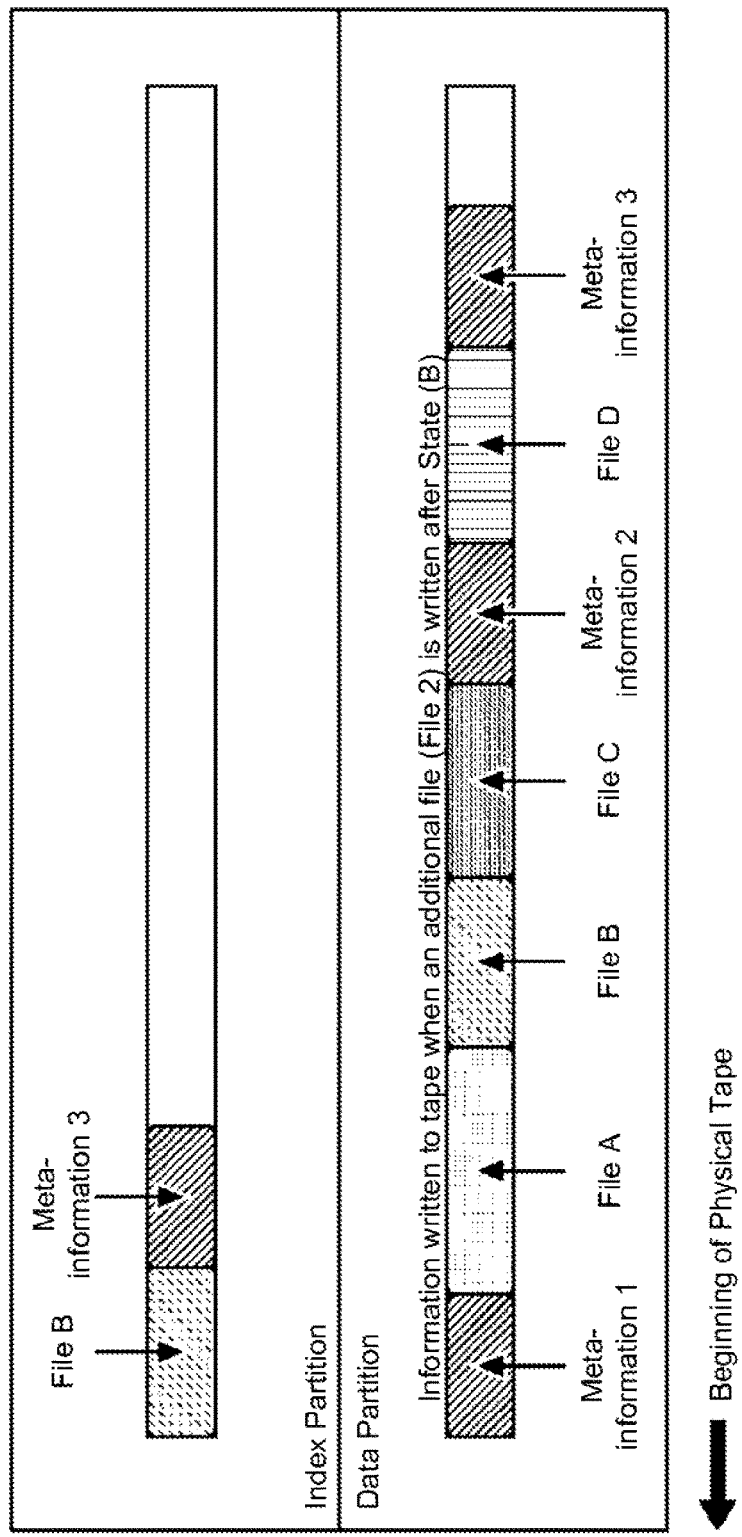
FIG. 6 shows an example of information recorded in a tape cartridge when a file has been written to the tape using LTFS, in accordance with an embodiment of the present disclosure.

FIG. 6 shows an example of information recorded in a tape cartridge when a file has been written to the tape using LTFS, in accordance with an embodiment of the present disclosure. Specifically indicated File B and the most recent Meta-information 3 have been recorded in the index partition. File A, File B, File C, File D, Meta-information 1, Meta-information 2, and Meta-information 3 have been recorded in the data partition. Here, Meta-information 1 and Meta-information 2 are old information. Because information is appended in a tape cartridge, meta-information is not overwritten but appended (append write) and saved along with old meta-information. The time interval at which meta-information is written to the data partition is explicitly indicated by the application, for example, when FlushFile-Buffers( ) is called, which is a standard API in Windows. This can also be set based on the times at which files are closed or after a predetermined amount of time has elapsed.

Figure 7:
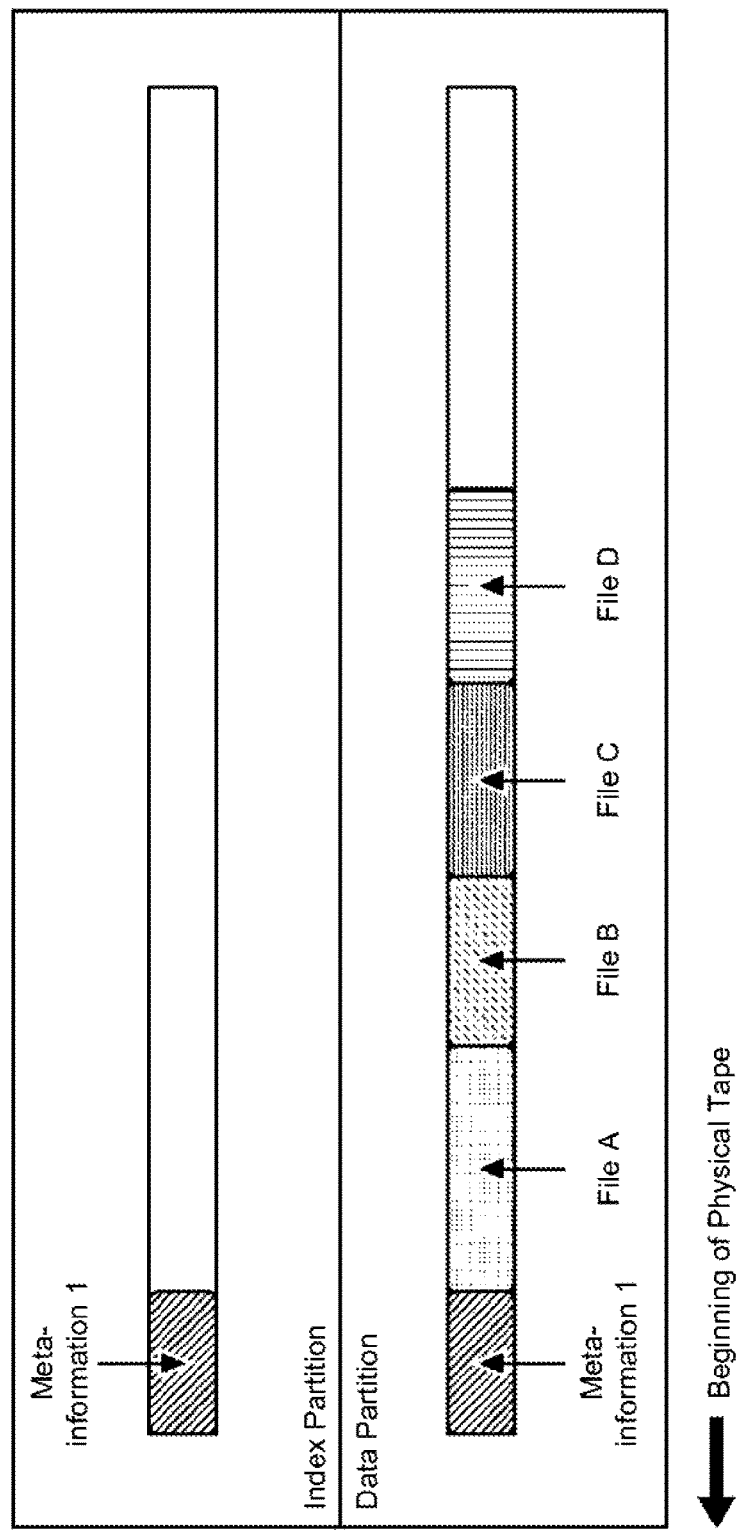
FIG. 7 shows an example in which only one set of meta-information has been written to the data partition, in accordance with an embodiment of the present disclosure.

FIG. 7 shows an example in which only one set of meta-information has been written to the data partition, in accordance with an embodiment of the present disclosure. When Files A, B, C and D have been written to the data partition after the tape cartridge has been formatted and mounted, the file information has been recorded on the tape. Here, Meta-information 1 is the meta-information written immediately after formatting and does not include the subsequently written file information. When a power loss has occurred before the tape cartridge in FIG. 7 has been unmounted, the data positions of Files A, B, C and D on the tape cannot be identified. Because there is no meta-information (extent) indicating the data positions of these files, all of the files are lost.

In order to minimize the loss of data when sudden losses of power occur, an LTFS can record meta-information in the data partition at, for example, five-minute intervals. Also, a recovery command (ltfsck) has been prepared for situations in which a sudden loss of power occurs before meta-information has been recorded in the index partition. By executing ltfsck, the most recent meta-information can be reproduced for a tape lacking the most recent file meta-information in the data partition. This reproduction is made possible by recording the most recent meta-information written to the data partition in the index partition. During the recovery operation, a tape cartridge in which files cannot be identified due to a loss of power can be mounted using conventional LTFS. Because recovery procedures have been established, the usual setting calls for meta-information to be periodically recorded in the data partition to prepare for the possibility of a sudden loss of power.

Figure 8:
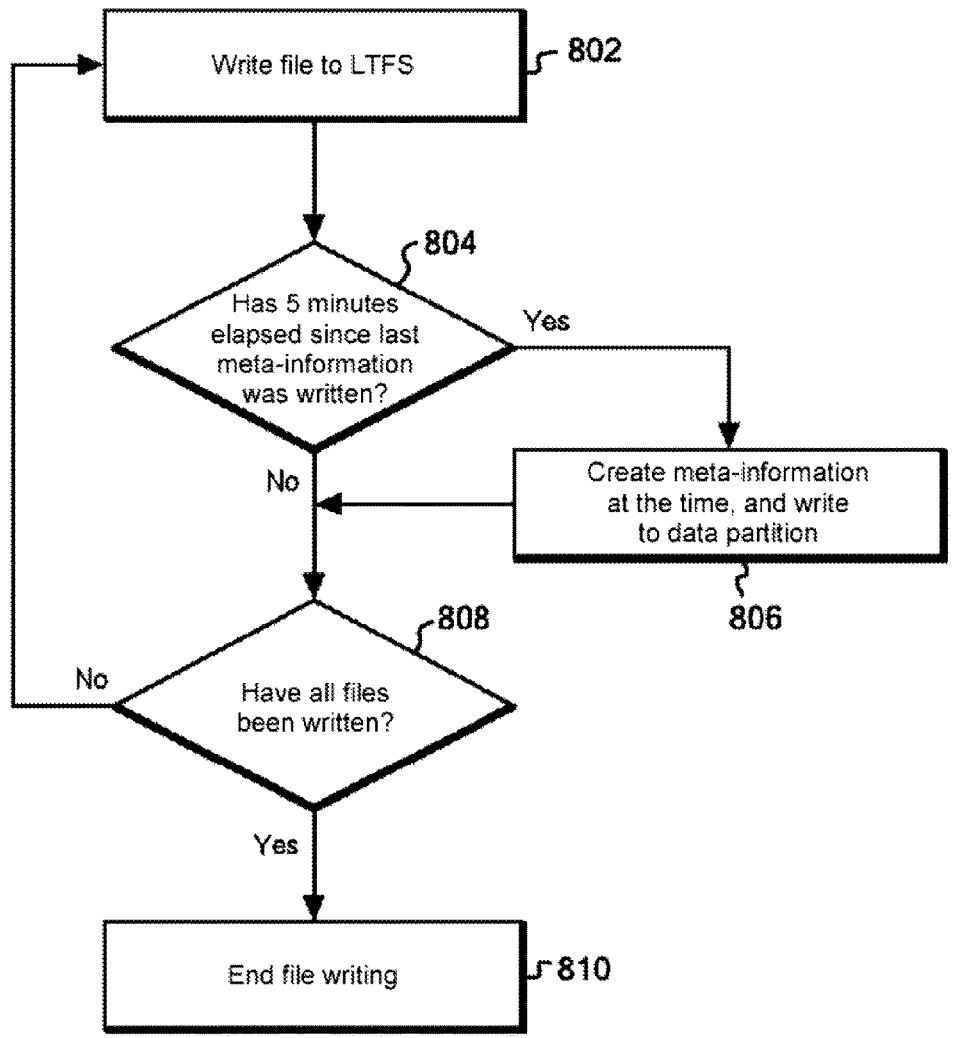
FIG. 8 is a flowchart of the meta-information writing process.

FIG. 8 is a flowchart of a meta-information writing process. When a large number of files have been recorded in LTFS, the recorded meta-information is very large. More specifically, when a large number of files are written to LTFS, meta-information is written to the data partition periodically, that is, each time five minutes has elapsed. When the host performs the file write access process, each of the following steps is executed in the tape drive system via the conventional file system (LTFS).

The host writes one or more files to the tape drive via LTFS (802). If it is determined that five minutes have elapsed since the last time meta-information was written (decision 804, YES branch), meta-information is created and written to the data partition (806). If it is determined that five minutes have not elapsed since the last time meta-information was written (decision 804, NO branch), it is determined whether or not all files to be written have been written (808). If it is determined that all files to be written have not been written (decision 808, NO branch), the host writes one or more files to the tape drive via LTFS (802). If it is determined that all files to be written have been written (decision 808, YES branch), the writing of files to the tape is complete (810).

In the present disclosure, after the LTFS has been scaled as S/W and meta-information has been written to the data partition, the file and directory access operation history (creations, deletions, path changes, changes to extended attributes, etc.) is temporarily stored in memory or on an HDD. When meta-information is written the next time, meta-information including only the new portion of the history is created and written to the data partition because the meta-information to be written belongs to Group B (i.e., it is differentiated meta-information). Here, for example, file deletions are not stored in conventional LTFS meta-information, but a special extended attribute (deletion flag) is provided for deleted files. The inclusion of a deletion flag in meta-information means a stored file has been deleted. A special extended attribute can be saved, for example, by setting the TRUE value in the "ltfs.vendor.IBM.deleted" attribute defined as a vendor-dependent attribute in the LTFS format.

Figure 9:
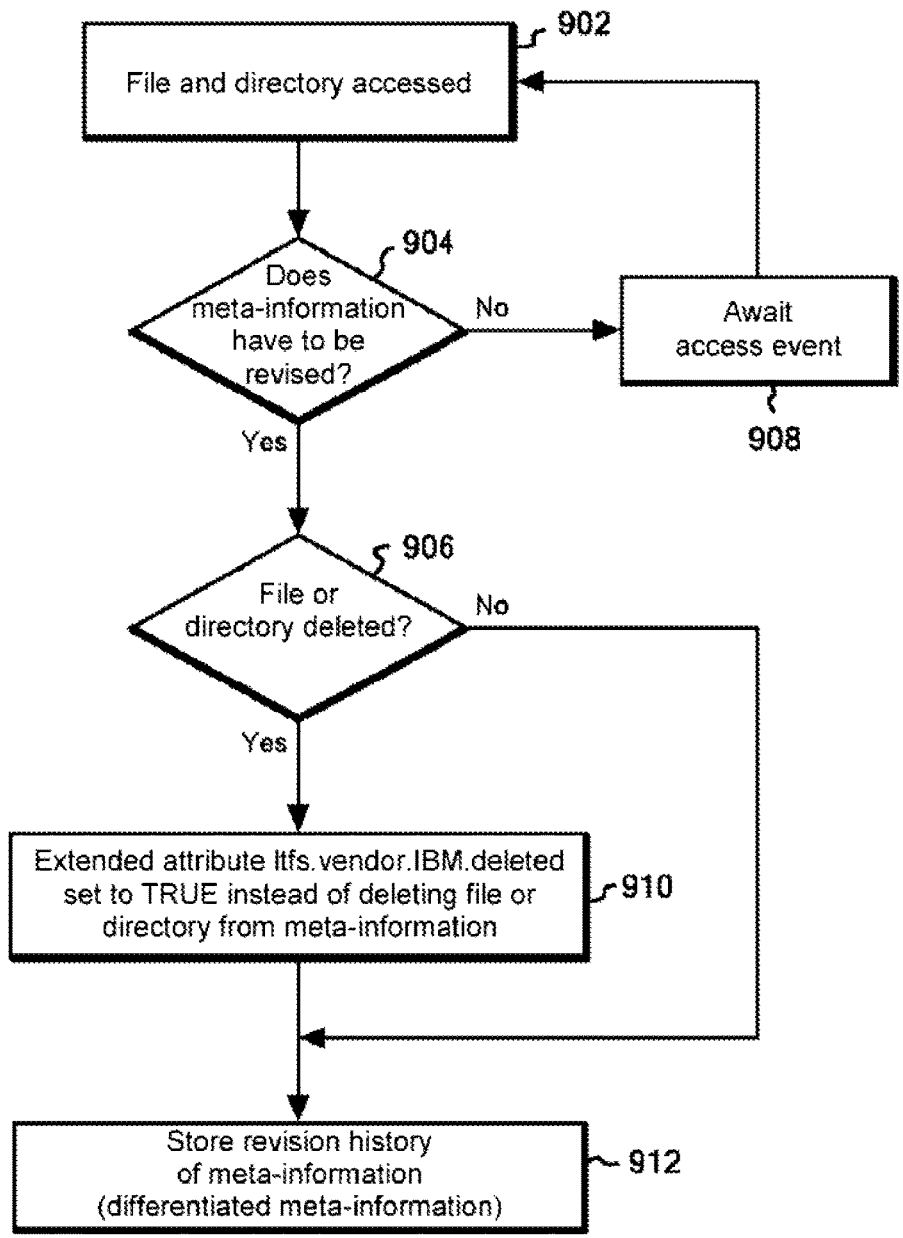
FIG. 9 is a flowchart of the revised history storage process for meta-information (differentiated meta-information), in accordance with an embodiment of the present disclosure.

FIG. 9 is a flowchart of a revised history storage process for meta-information (i.e., differentiated meta-information), in accordance with an embodiment of the present disclosure.

When the history of file and directory processing is referred to as the history of meta-information or differentiated meta-information, the history of meta-information is saved in accordance with logic depicted in FIG. 9. The file system in the present disclosure executes each operation related to access by the application (FIG. 3).

As shown in FIG. 9, file and/or directory access is received (902). For example, access for a change, an addition, or a deletion is received from the application for the access operation history for file processing. The file system determines whether or not meta-information has to be revised. This determination includes determining whether or not differentiated meta-information reflecting the history of this processing has been generated for files after the index for Group A (i.e., base meta-information) has been stored. If it is determined that meta-information does not have to be revised (decision 904, NO branch), application access for processing the next file is awaited (908). For example, host access is awaited until differentiated meta-information is generated. If it is determined that meta-information has to be revised (decision 904, YES branch), it is determined whether or not a file or directory deletion, for example, has been included in the processing history (906). If it is determined that a file or directory deletion has been included in the processing history (decision 906, YES branch), the extended attribute flag "ltfs.vendor.IBM.deleted" is set to true instead of deleting the file or directory from the meta-information (910). A TRUE value in the LTFS extended attribute flag "ltfs.vendor.IBM.deleted" indicates that a stored file has been deleted by an application access. This extended attribute flag is included in the differentiated meta-information. The changed meta-information is stored in the LTFS memory as the revision history for the meta-information (912). If it is determined that a file or directory deletion has not been included in the processing history (decision 906, NO branch), the changed meta-information is stored in the LTFS memory as the revision for the meta-information (912). If there has been application access for something other than a file or directory deletion, a file or directory deletion has not been included in the processing history, and meta-information related to file name changes, added files, or file data changes is provided as differentiated meta-information.

Figure 10:
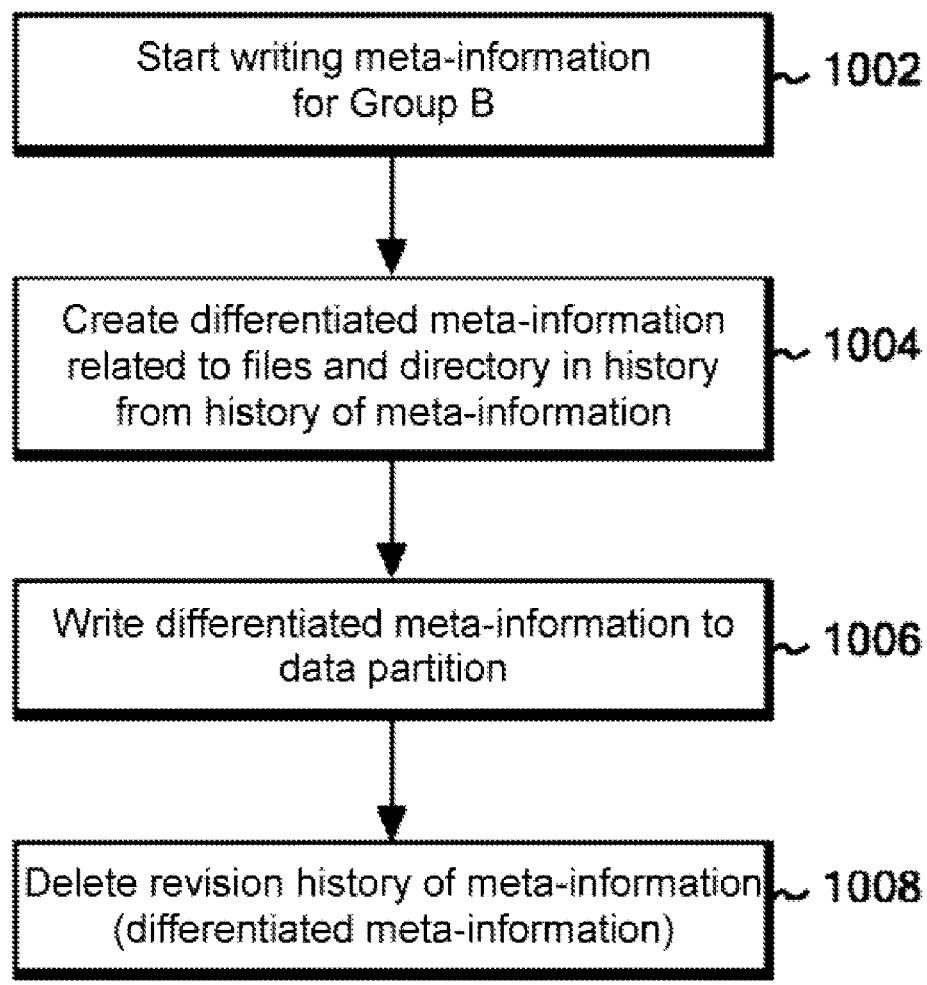
FIG. 10 is a flowchart of the differentiated meta-information storage process, in accordance with an embodiment of the present disclosure.

FIG. 10 is a flowchart of the differentiated meta-information storage process, in accordance with an embodiment of the present disclosure. This flowchart shows the operations performed to store on the tape a revision history for meta-information stored in the memory of the LTFS described with respect to FIG. 9. In the LTFS settings, differentiated meta-information for Group B is written to the data partition periodically or when meta-information is written once a file has been closed. In the file system described in the present disclosure, each step is executed by the tape drive system.

The Group B differentiated meta-information writing (storage) process is started (1002) when the changed meta-information is stored in the LTFS memory as the revision history for the meta-information (912), as described with respect to FIG. 9. Differentiated meta-information related to a file or directory included in the history is created from the differentiated history of the meta-information stored in the memory of the LTFS. The differentiated meta-information is written by appending it to the data partition (1006), and the revision history of the meta-information stored in the memory of the LTFS is deleted (1008).

During unmounting, or when Group A meta-information (i.e., base meta-information) is written by calling FlushFileBuffers( ), meta-information including all of the file and directory information is written, and the revision history of the meta-information is simply deleted. Thus, meta-information belonging to Group A or Group B (i.e., base meta-information or differentiated meta-information) can be written by extending LTFS in accordance with the present disclosure. FIG. 9 is a flowchart of the operations performed when a revision history is created in the LTFS memory, while FIG. 10 is a flowchart of the operations performed when this revision history is written to the tape.

Figure 11:
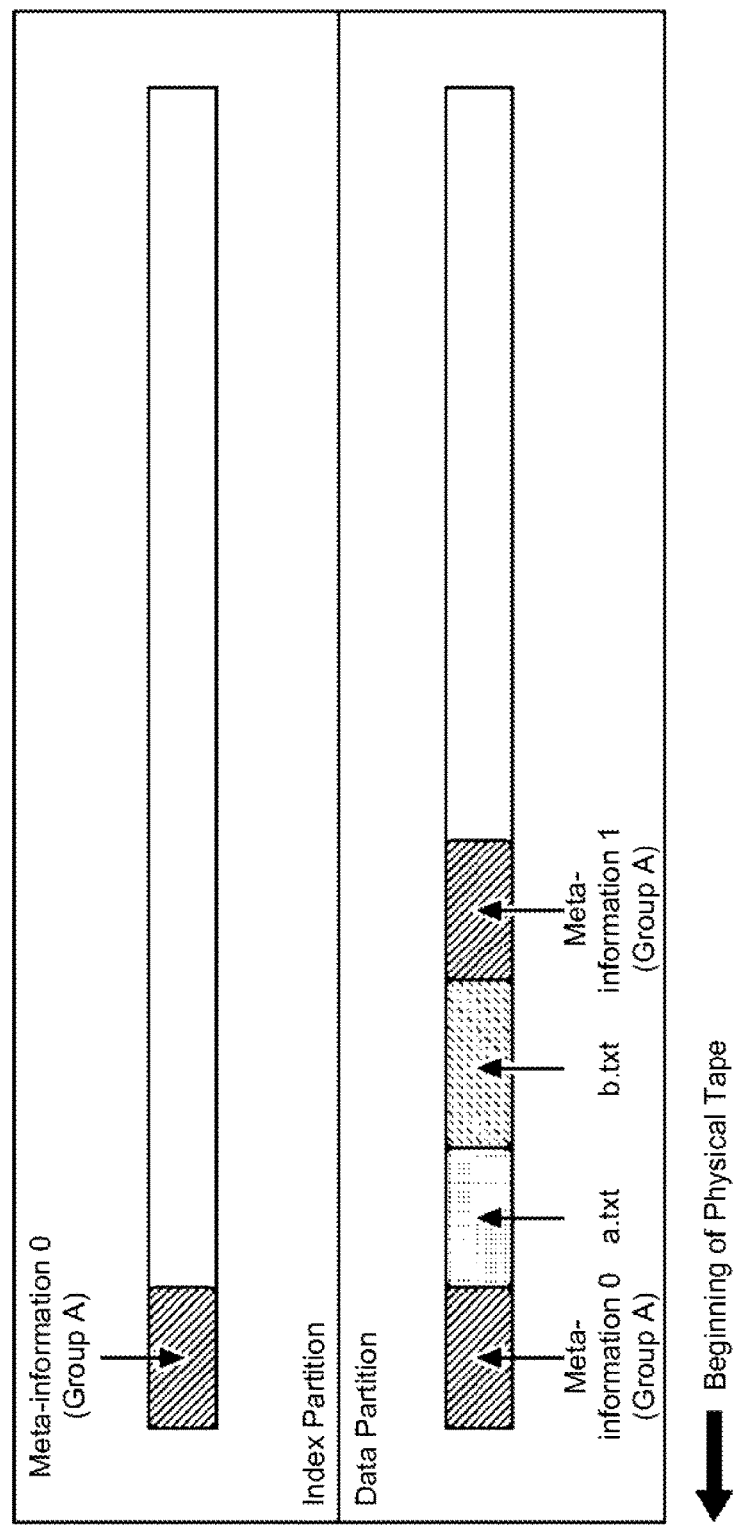
FIG. 11 shows a first example in which data and meta-information for two files has been placed on the tape, in accordance with an embodiment of the present disclosure.
Figure 12:
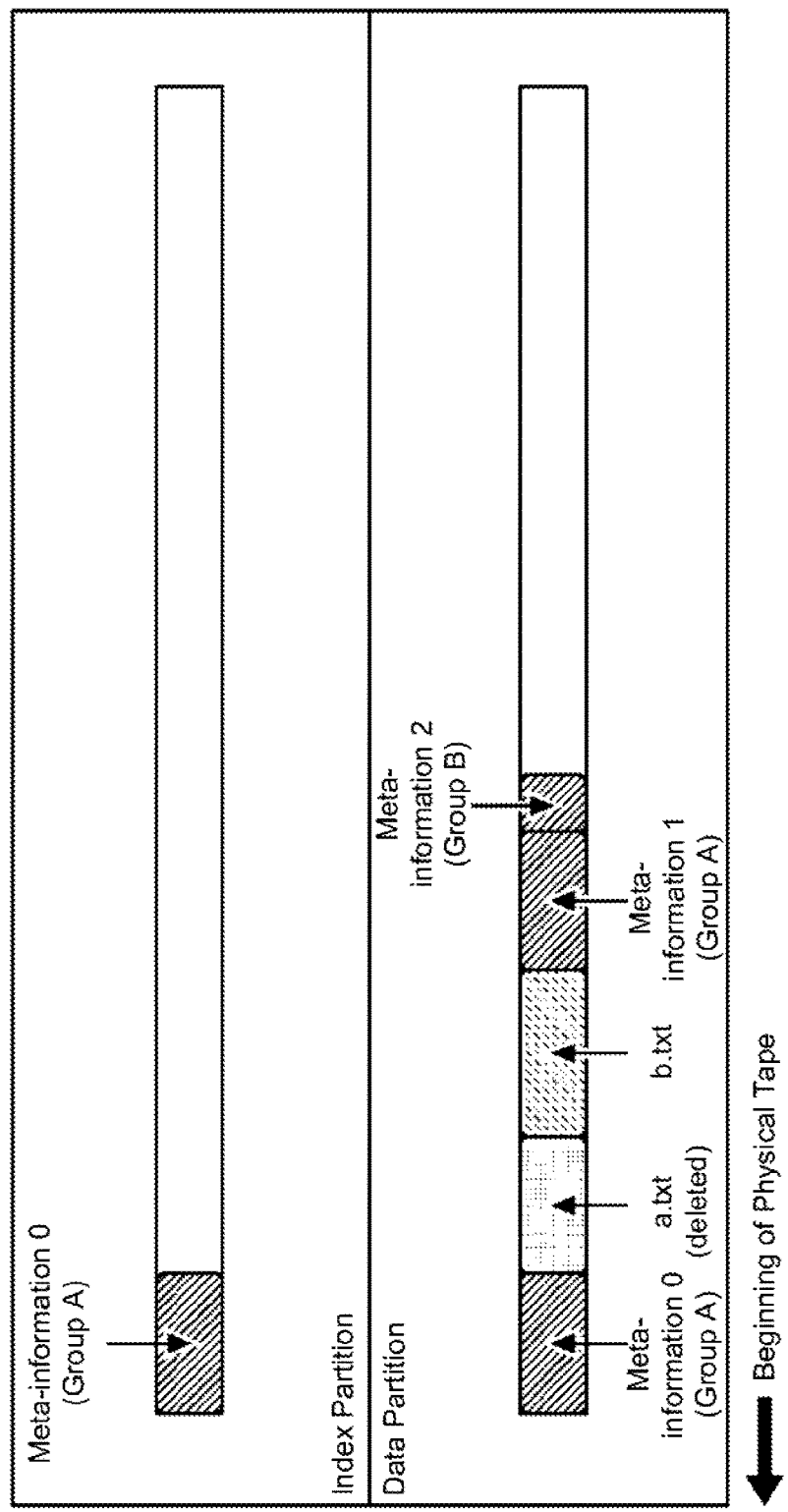
FIG. 12 shows a second example in which data and meta-information for the two files has been placed on the tape and one of the files has been deleted, in accordance with an embodiment of the present disclosure.
Figure 13:
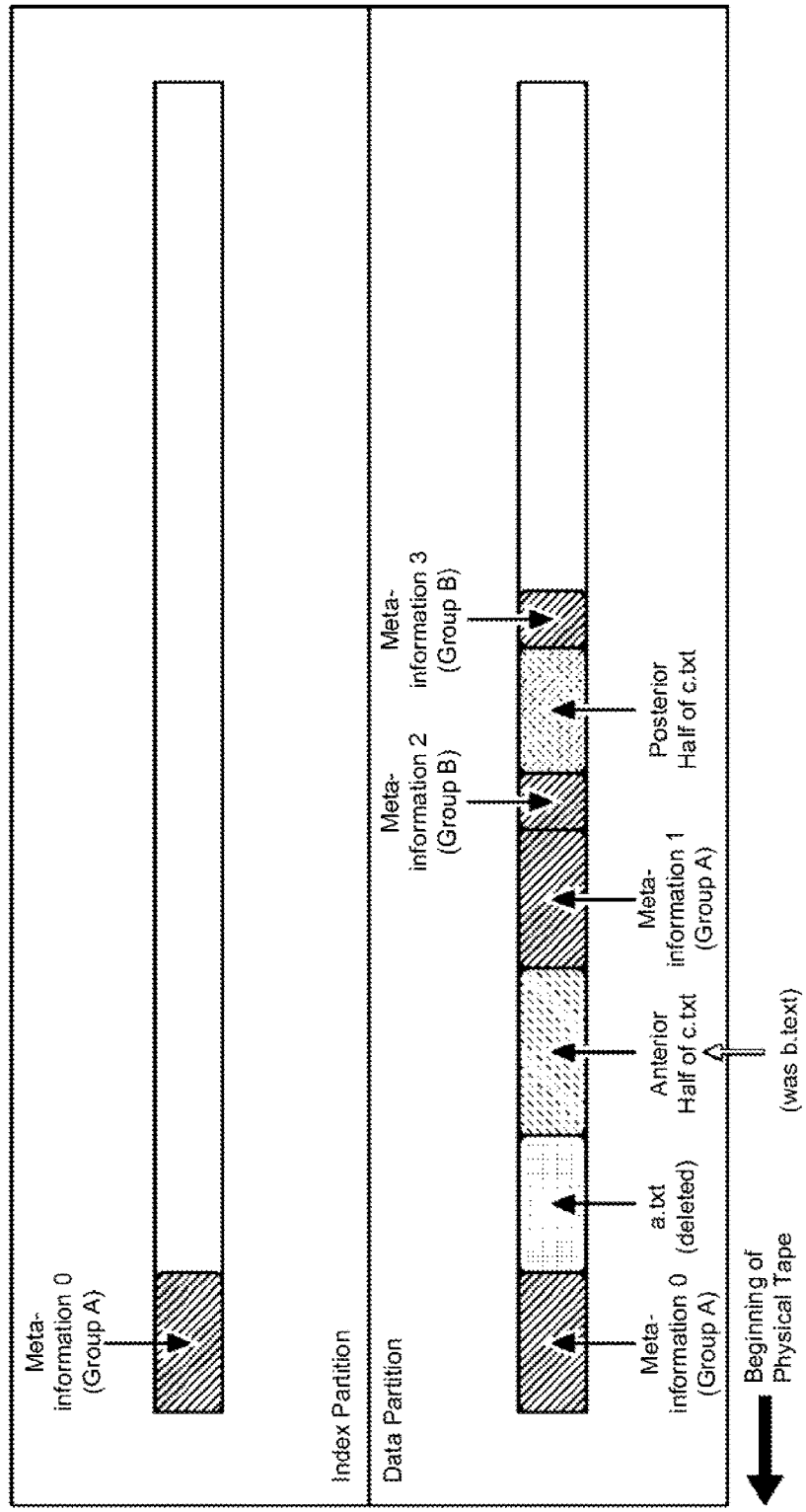
FIG. 13 shows a third example in which the file remaining on the tape has been updated with additional data, and the file name has been changed, in accordance with an embodiment of the present disclosure.

FIGS. 11-13 depict specific examples of meta-information written using an extended LTFS, in accordance with embodiments of the present disclosure.

FIG. 11 shows a first example in which data and meta-information for two files has been placed on the tape, in accordance with an embodiment of the present disclosure. Meta-information 0 and Meta-information 1 are similar to meta-information commonly used in a conventional LTFS. As used herein, Meta-information 0 during formatting includes an index tag (creator tag) that classifies the meta-information as belonging to Group A (i.e., base meta-information). Meta-information 0 is stored in the data partition and index partition. Meta-information 1 is identified as meta-information belonging to Group A using a specific index tag. The content of the creator tag (provided in the XML display) can be freely determined by vendors in the LTFS format. In the first example, two files are recorded, a.txt and b.txt. Meta-information 1, which includes meta-information on a.txt and b.txt (file name, time step, location information, etc.), is appended to the data partition after the two files. Meta-information 1 is not stored in the index partition.

FIG. 12 shows a second example in which data and meta-information for the two files has been placed on the tape and one of the files has been deleted, in accordance with an embodiment of the present disclosure. When File a.txt in the first example has been deleted and Group B meta-information (i.e., differentiated meta-information) has been written, Meta-information 2 is appended as shown. A specific index tag (creator tag) displayed in XML is used to indicate that Meta-information 2 belongs to Group B. In order to indicate that a file has been deleted, the extended attribute ltfs.vendor.IBM.deleted (i.e., a delete flag) is stored as TRUE. Here, meta-information is not stored for File b.txt, and only "differentiated meta-information" reflecting the operation history for the changed file is stored. In the second example, one file (File a.txt) has been deleted, but a.txt remains on the tape. Differentiated Meta-information 2 includes a delete flag associated with a.txt indicating that a.txt is a deleted file. Because File b.txt was not accessed in the Group B processing, differentiated Meta-information 2 does not include meta-information for b.txt. Differentiated Meta-information 2 is stored after Meta-information 1 in the data partition.

FIG. 13 shows a third example in which the file remaining on the tape has been updated with additional data, and the file name has been changed, in accordance with an embodiment of the present disclosure. Meta-information 1, Meta-information 2 and Meta-information 3 reflecting the file access operation history in the first, second and third examples is appended to the tape sequentially in the "historic" order in which the file operations were performed. After the operations performed in the first and second examples, access operation process history is performed in which data has been added to File b.txt and the name of File b.txt has been changed to c.txt. Meta-information 3 for these operations is written as Group B differentiated meta-information in the creator tag in the XML display. Meta-information 3 stores only meta-information related to changed File b.txt. More specifically, Meta-information 3 includes meta-information in which the file name of existing file b.txt is changed to c.txt, and meta-information (an extent) indicating the location of the data in the latter half of c.txt. Meta-information 3, which is differentiated meta-information, is written after the latter half of c.txt appended to the data partition. Finally, FIG. 13 shows the physical arrangement on the tape of the file data and meta-information 1, 2, 3 in the first, second and third examples providing the historic file processing operations.

Figure 14:
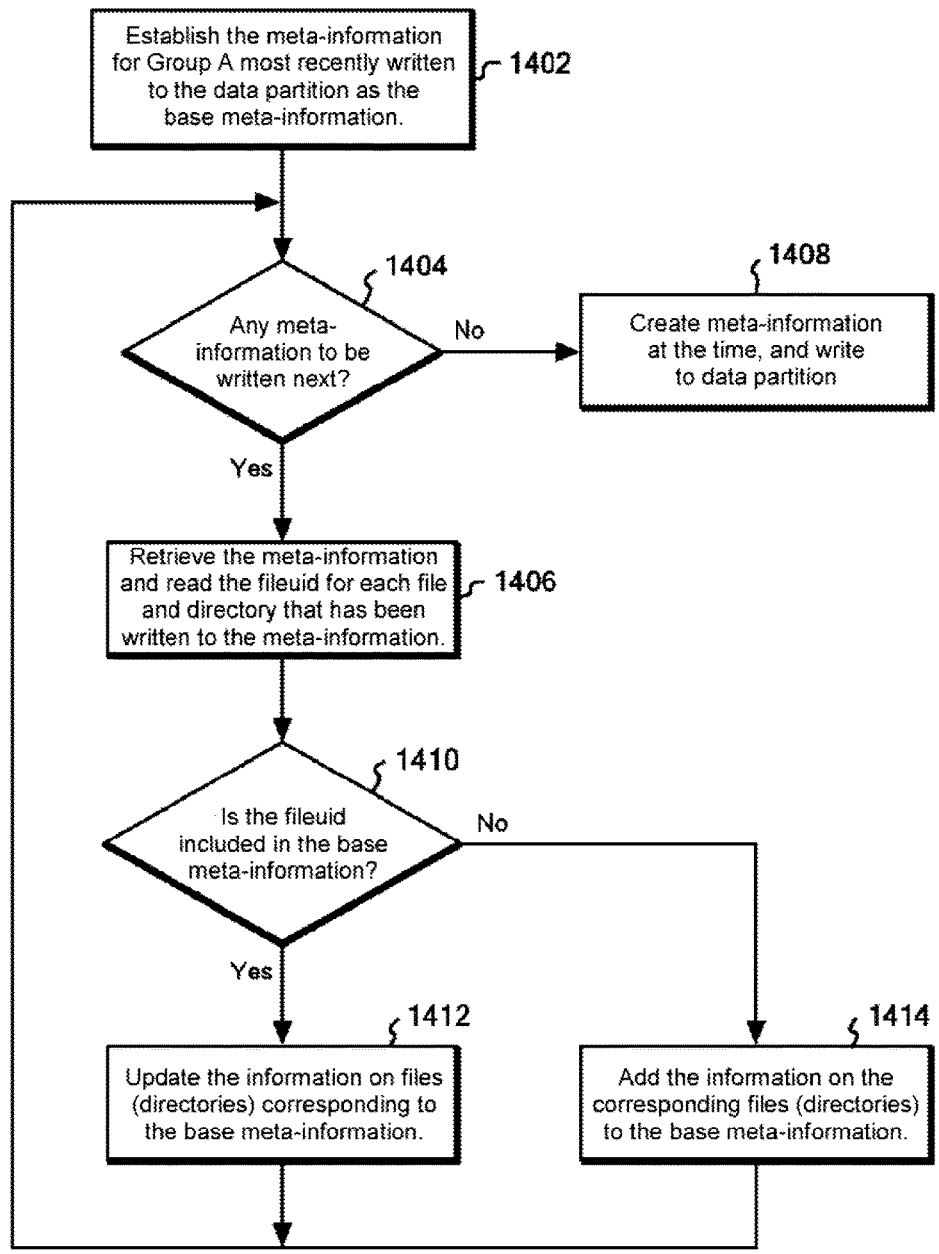
FIG. 14 is a flowchart of the process used to create meta-information (an index) to be written to the index partition for the recovery program (API), in accordance with an embodiment of the present disclosure.

FIG. 14 is a flowchart of the process used to create meta-information (an index) to be written to the index partition for the recovery program (API), in accordance with an embodiment of the present disclosure. When a sudden loss of power occurs, ltfsck creates meta-information to be written to the index partition in accordance with FIG. 14. In an LTFS implementation that incorporates the functionality of the present disclosure, the file system API is provided as a separate recovery program. For example, the recovery program includes steps for recovering the index in the index partition of a medium on which differentiated meta-information has been periodically stored using the enhanced LTFS of the present disclosure. The program incorporating the recovery functions executes the logic depicted in FIG. 14.

The meta-information for Group A (i.e., base meta-information) most recently written to the data partition is read and established as the base meta-information (1402). It is also determined whether or not there is any meta-information to be written (1404). This determination (1404) is made, at least in part, by reading the sequence of differentiated meta-information stored on the medium in Group B mode of the LTFS from the data partition. If differentiated meta-information is not found (decision 1404, NO branch), the base meta-information is stored in the index partition (1408). If differentiated meta-information is found (decision 1404, YES branch), the meta-information is retrieved, and the fileuid (file ID) for each file and directory that has been written in the meta-information is read (1406). Here, "fileuid" is in the XML display the meta-information (index) and is provided as a file ID to identify a file.

If the fileuid included in the differentiated meta-information is also included in the base meta-information (decision 1410, YES branch), the appropriate file information is updated in the base meta-information (1412). The subsequent differentiated meta-information indicates the inclusion of meta-information reflecting the access operation history (e.g., deletions, added data, file name changes, etc.) for a file sharing the ID included in the base meta-information. In order to create a final index with the shared file, changes are made to the shared file reflecting the sequence of differentiated meta-information in the base meta-information.

If the fileuid included in the differentiated meta-information is not included in the base meta-information (decision 1410, NO branch), the appropriate file information is added to the base meta-information (1414). The subsequent differentiated meta-information indicates the inclusion of an access operation history (deletions, added data, file name changes, etc.) with a file not included in the base meta-information. Therefore, in order to create a final index with the new file, the sequence of differentiated meta-information for the other file is added to the base meta-information.

In various embodiments, the meta-information records with special information called file marks on the tape. Because these are defined by the LTFS format, the most recently written meta-information can be easily retrieved.

By searching the meta-information for previously written file marks, previously written meta-information can also be retrieved. Therefore, meta-information can be retrieved in the reverse order in which it was written from the meta-information most recently written on the tape. By compiling a list of meta-information in reverse order until Group A meta-information (i.e., base meta-information) has been found, all of the meta-information required for performing the operations in the flowchart shown in FIG. 14 can be retrieved.

Using the logic depicted in figures and described herein, changes can be applied to the Group A meta-information (i.e., base meta-information) using Group B meta-information (i.e., differentiated meta-information). Therefore, the most recently written meta-information can be recovered after a sudden loss of power.

FIGS. 15A and 15B are tables that compare the data volume and meta-information volume when 10-KB, 20-KB and 30-KB files are written to a tape cartridge with the LTFS of the present disclosure and xcopy command, in accordance with an embodiment of the present disclosure. FIG. 15A and FIG. 15B show the amount of written data and the proportions of written data when as many 10-KB, 20-KB, and 30-KB files as possible have been written to an LTO5 tape cartridge using conventional LTFS and LTFS enhanced according to the present invention. FIG. 15A shows the amount of file data and meta-information written to the data partition using conventional LTFS. FIG. 15B shows the amount of file data and meta-information written to the data partition using LTFS enhanced in accordance with the present disclosure. In the case of conventional LTFS, meta-information takes up more than 90% of the data partition. However, in the case of LTFS enhanced in accordance with the present disclosure, the amount is less than 5%.

In the example described above, the functionality described in the present disclosure enabled meta-information to be recovered in the case of a sudden loss of power while also keeping the meta-information from occupying most of the data partition. The functionality described above was explained above using one embodiment, but the technical scope of the present invention is not limited in any way to the embodiment. It should be clear to a person of skill in the art that various modifications and substitutions can be made without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for storing meta-information related to file access histories on tape recording systems, the method comprising:
    storing base meta-information on a tape in accordance with a linear tape file system, wherein the tape includes (i) a data partition for, at least in part, storing file data, (ii) an index partition for storing meta-information, and wherein (i) the base meta-information is meta-information that is associated with one or more files that are stored on the tape and is based, at least in part, on a tape access operation history and (ii) storing the base meta-information to the tape includes appending the base meta-information to the data partition; and
    storing, in accordance with the linear tape file system, a first quantity of differentiated meta-information on the tape at a predetermined time interval after storing the base meta-information, wherein the first quantity of differentiated meta-information is based, at least in part, on the tape access operation history and reflects a history of at least one file of the one or more files that are associated with the base meta-information and wherein storing the first quantity of differentiated meta-information includes appending the first quantity of differentiated meta-information to the data partition.

2. The method of claim 1, further comprising:
    updating the base meta-information based, at least in part, on the first quantity of differentiated meta-information to construct a first index of meta-information; and
    appending the first index of meta-information to the index partition when one of a predetermined command and a command to unmount the tape is received.

3. The method of claim 2, further comprising:
    appending a second quantity of differentiated meta-information to the data partition of the tape at a predetermined time interval after storing the first quantity of differentiated meta-information, wherein the second quantity of differentiated meta-information is based, at least in part, on the tape access operation history and reflects one or more events that are, in a history of at least one file of the one or more files that are associated with the base meta-information, subsequent to storing the first quantity of differentiated meta-information.

4. The method of claim 3, further comprising:
    updating the first index of meta-information based, at least in part, on the second quantity of differentiated meta-information to construct a second index of meta-information; and
    appending the second index of meta-information to the index partition when one of a predetermined command and a command to unmount the tape is received.

5. The method of claim 3, wherein a first type of identification tag identifies the base meta-information as base meta-information and a second type of identification tag identifies the first quantity and the second quantity of differentiated meta-information as differentiated meta-information.

6. The method of claim 3, further comprising:
    in response to determining that the tape access operation history includes a deletion of a file that is stored in the data partition, associating a deletion flag with the deleted file in the second quantity of differentiated meta-information, wherein the file was deleted after the first quantity of differentiated meta-information was stored on the tape.

7. The method of claim 3, further comprising:
    appending a modified portion of a modified file to the data partition of the tape, wherein the modified file is associated with the base meta-information and the second quantity of differentiated meta-information includes meta-information that is associated with the modified portion.

8. The method of claim 3, wherein the second quantity of differentiated meta-information includes meta-information that changes the name of a file that is associated with the base meta-information.

9. A storage system, the storage system comprising one or more storage media, the one or more storage media including a tape, the storage system operating to:

store base meta-information on the tape in accordance with a linear tape file system, wherein the tape includes (i) a data partition for, at least in part, storing file data, (ii) an index partition for storing meta-information, and wherein (i) the base meta-information is meta-information that is associated with one or more files that are stored on the tape and is based, at least in part, on a tape access operation history and (ii) storing the base meta-information to the tape includes appending the base meta-information to the data partition; and store, in accordance with the linear tape file system, a first quantity of differentiated meta-information on the tape at a predetermined time interval after storing the base meta-information, wherein the first quantity of differentiated meta-information is based, at least in part, on the tape access operation history and reflects a history of at least one file of the one or more files that are associated with the base meta-information and wherein storing the first quantity of differentiated meta-information includes appending the first quantity of differentiated meta-information to the data partition.

10. The storage system of claim 9, wherein the storage system further operates to:

update the base meta-information based, at least in part, on the first quantity of differentiated meta-information to construct a first index of meta-information; and append the first index of meta-information to the index partition when one of a predetermined command and a command to unmount the tape is received.

11. The storage system of claim 10, wherein the storage system further operates to:

append a second quantity of differentiated meta-information to the data partition of the tape at a predetermined time interval after operating to store the first quantity of differentiated meta-information, wherein the second quantity of differentiated meta-information is based, at least in part, on the tape access operation history and reflects one or more events that are, in a history of at least one file of the one or more files that are associated with the base meta-information, subsequent to operating to store the first quantity of differentiated meta-information.

12. The storage system of claim 11, wherein the storage system further operates to:

update the first index of meta-information based, at least in part, on the second quantity of differentiated meta-information to construct a second index of meta-information; and append the second index of meta-information to the index partition when one of a predetermined command and a command to unmount the tape is received.

13. The storage system of claim 11, wherein a first type of identification tag identifies the base meta-information as base meta-information and a second type of identification tag identifies the first quantity and the second quantity of differentiated meta-information as differentiated meta-information.

14. The storage system of claim 11, wherein the storage system further operates to:

determine that the tape access operation history includes a deletion of a file that is stored in the data partition, and in response, associate a deletion flag with the deleted file in the second quantity of differentiated meta-information, wherein the file was deleted after the first quantity of differentiated meta-information was stored on the tape.

15. A method for recovering information from a tape storage medium, the method comprising:

reading a most recently written quantity of base meta-information from a data partition of a tape in accordance with a linear tape file system;

responsive to determining that the data partition includes subsequent differentiated meta-information that was written to the data partition after the most recently written quantity of base meta-information, updating the base meta-information based at least in part, on the subsequent differentiated meta-information to construct a recovered index of meta-information; and appending the recovered index of meta-information to an index partition of the tape in accordance with the linear tape file system.

16. The method of claim 15, further comprising:

responsive to determining that the subsequent differentiated meta-information in associated with one or more file IDs that are not associated with the most recently written base meta-information, adding meta-information that is associated with the one or more file IDs to the most recently written quantity of base meta-information.

17. A storage system, the storage system comprising one or more storage media, the one or more storage media including a tape, the storage system operating to:

read a most recently written quantity of base meta-information from a data partition of a tape in accordance with a linear tape file system;

determine that the data partition includes subsequent differentiated meta-information that was written to the data partition after the most recently written quantity of base meta-information, and in response, update the base meta-information based at least in part, on the subsequent differentiated meta-information to construct a recovered index of meta-information; and append the recovered index of meta-information to an index partition of the tape in accordance with the linear tape file system.

18. The storage system of claim 17, wherein the storage system further operates to:

determine that the subsequent differentiated meta-information in associated with one or more file IDs that are not associated with the most recently written base meta-information, and in response, add meta-information that is associated with the one or more file IDs to the most recently written quantity of base meta-information.

* * * * *